(12) United States Patent
Wagner et al.

(10) Patent No.: US 7,126,741 B2
(45) Date of Patent: Oct. 24, 2006

(54) LIGHT MODULATOR ASSEMBLY

(75) Inventors: William R. Wagner, Escondido, CA (US); Winthrop D. Childers, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 58 days.

(21) Appl. No.: 10/917,128

(22) Filed: Aug. 12, 2004

(65) Prior Publication Data
US 2006/0033980 A1    Feb. 16, 2006

(51) Int. Cl.
*G02B 26/00* (2006.01)
*G02F 1/03* (2006.01)
*G02F 1/1333* (2006.01)

(52) U.S. Cl. ............ 359/290; 359/291; 359/292; 359/293; 359/294; 359/295; 359/298; 359/302; 359/303; 359/318; 359/223; 359/224; 359/279; 359/245; 359/247; 250/370.15; 257/431; 257/443; 349/161; 62/3.7

(58) Field of Classification Search ........ 359/290–295, 359/298, 302, 303, 318, 223, 224, 279, 245, 359/247, 726, 727; 250/370.15; 257/431, 257/443; 349/161; 62/3.7
See application file for complete search history.

(56) References Cited

U.S. PATENT DOCUMENTS

| | | | |
|---|---|---|---|
| 6,430,934 B1 * | 8/2002 | Evans et al. | 62/3.7 |
| 6,639,743 B1 | 10/2003 | Watanabe | |
| 6,644,820 B1 | 11/2003 | Orcutt | |
| 6,726,331 B1 | 4/2004 | Miyata | |
| 6,963,440 B1 * | 11/2005 | Martin et al. | 359/290 |
| 2004/0125431 A1 * | 7/2004 | Mehrl | 359/290 |
| 2004/0251539 A1 * | 12/2004 | Faris et al. | 257/712 |

* cited by examiner

Primary Examiner—Evelyn A. Lester

(57) ABSTRACT

A light modulator assembly includes a substrate, a micro-electro mechanical semiconductor device (MEMS device) formed on the substrate, and a temperature control device coupled to the substrate and configured to maintain the MEMS device at or above an elevated threshold temperature.

49 Claims, 6 Drawing Sheets

LIGHT MODULATOR ASSEMBLY

BACKGROUND

MEMS devices designed to perform optical functions have been developed using a variety of approaches. According to one approach, a deformable deflective membrane is positioned over an electrode and is electrostatically attracted to the electrode. Other approaches use flaps or beams of silicon or aluminum which form a top conducting layer. With optical applications, the conducting layer is reflective while the deflective membrane is deformed using electrostatic force to direct light which is incident upon the conducting layer.

More specifically, a MEMS technology termed Diffractive Light Devices (DLDs) produce colors based on the precise spacing of a pixel plate to related lower (and possibly upper) plates. This spacing is the result of a balance of two forces: electro-static attraction based on voltage and charge on the plates, and a spring constant of one or more "flexures" maintaining the position of the pixel plate away from the electrostatically charged plate. One traditional approach for controlling the gap distance is to apply a continuous control voltage to the electrodes, wherein the control voltage is increased to decrease the gap distance, and vice-versa. However, precise gap distance control may be affected by a variation in operating temperatures experienced by the DLD.

This variation is often caused by light absorption. As the DLD operates, light of the desired wavelength is emitted from the DLD. Much of the rest of the light that enters the DLD is absorbed. This light absorption causes the temperature of the DLD to rise.

As the temperature of the DLD rises, the spring constant of the flexures decreases. As a result, at an elevated temperature the spring force opposing a given electrostatic force is smaller. Consequently, the application of a given electrostatic force results in a smaller resulting gap at elevated temperatures. As the resulting gap distance changes with temperature so does the output of the DLD. This variation in the gap distance reduces the precision of the DLD and consequently causes the resultant color to shift undesirably.

Several approaches have been undertaken to compensate for this temperature change. Many of these approaches attempt to regulate the input voltage by monitoring the output of the DLD and modulating the control voltage to obtain a temperature compensated voltage gap. These approaches are often complicated and involve expensive monitoring and processing circuitry.

SUMMARY

A light modulator assembly includes a substrate, a microelectro mechanical semiconductor device (MEMS device) formed on the substrate, and a temperature control device coupled to said substrate and configured to maintain the MEMS device at or above an elevated threshold temperature.

BRIEF DESCRIPTION OF THE DRAWINGS

The accompanying drawings illustrate various embodiments of the present system and method and are a part of the specification. The illustrated embodiments are merely examples of the present system and method and do not limit the scope of the system and method.

Throughout the drawings, identical reference numbers designate similar, but not necessarily identical, elements.

DETAILED DESCRIPTION

Figure 1:
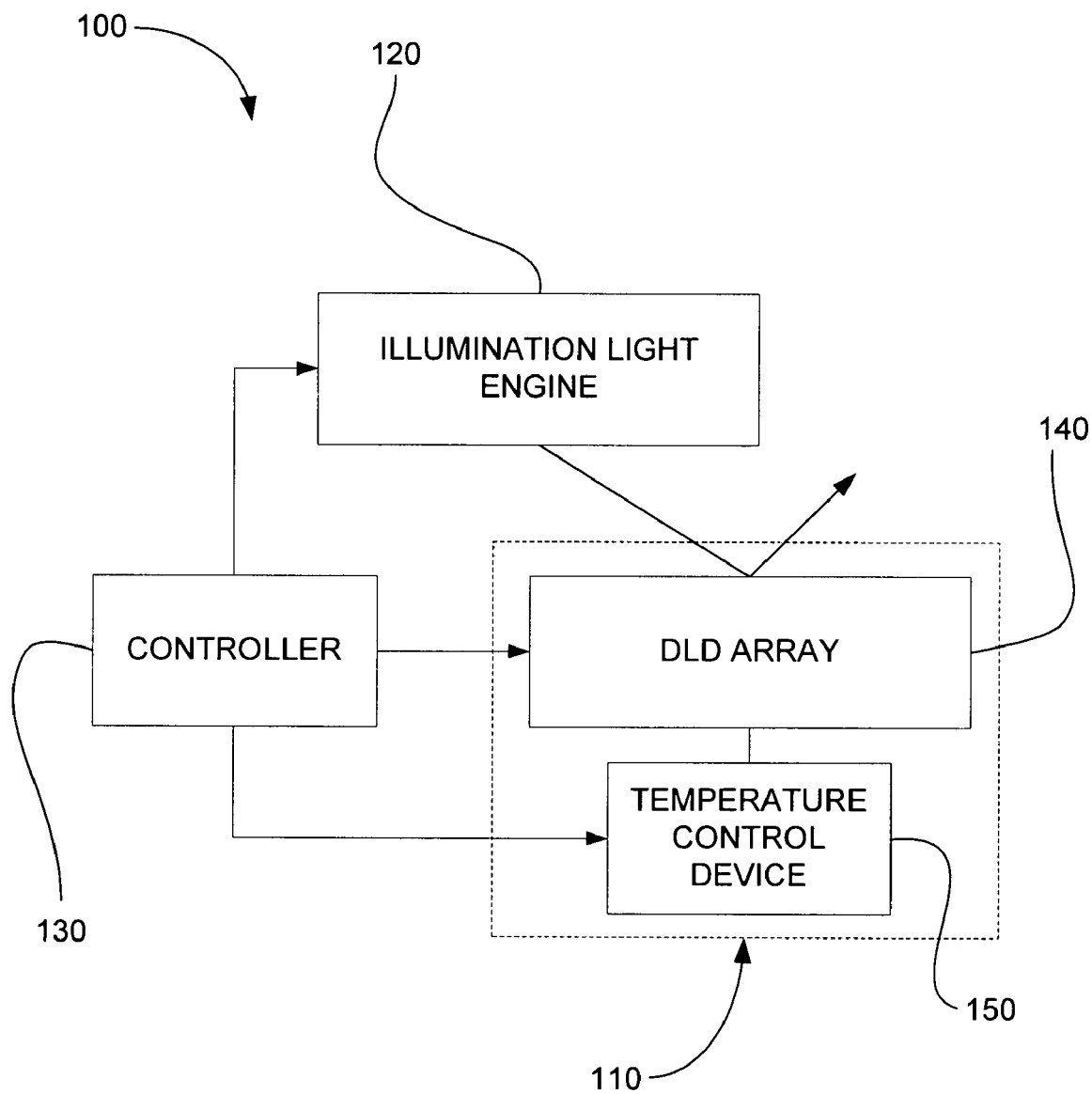
FIG. 1 is a schematic view of an exemplary display system.

A method and apparatus are provided for stabilizing the optical output performance of a MEMS-based light modulator. Some light modulators such as certain interferometric light modulators and liquid crystal light modulators are "analog" in nature. By analog, we refer to light modulators that modulate or control a characteristic of a light signal in a continuous manner in response to a control signal. The present system includes an analog light modulator that utilizes a temperature control device to stabilize the response of the analog modulator to the control signal. Stated another way, the temperature control device provides stability and/or predictability for the magnitude of how the light signal characteristic varies in response to the control signal.

As stated before light signal characteristic varies continuously in response to an input control signal. In an exemplary embodiment, the light signal characteristic is a wavelength of a spectral distribution peak. The light modulator receives broad spectrum or "white" light and outputs a light distribution with a spectral peak. Thus, it outputs a color peak that varies between red and violet. In an alternative embodiment, the light signal characteristic is an attenuation level of light that varies in response to a control signal.

The control signal can be a DC voltage, AC voltage, or charge level applied to the light modulator. In the exemplary embodiment the control signal is applied to an optical cavity having a dimension that responds to the applied signal. Varying the dimension of the optical cavity varies the wavelength of a spectral peak that is output by the cavity when the cavity receives broad spectrum light. We may refer to this exemplary embodiment as a Digital Light Device (DLD) interferometric light modulator.

The present system is discussed with reference to an analog modulator such as a DLD modulator whose output light signal characteristics as a function of incoming signals exhibit some variation with temperature. The present system includes a temperature control device that receives power signals from control electronics that assure that a temperature range experienced by the analog modulator is controlled within a temperature range that assures proper control of the output light signal characteristics.

The temperature control device may include a heater resistor and/or a thermoelectric device such as a Peltier junction. The temperature control device is configured to be in thermal contact with the analog light modulator and preferably heats and/or cools a portion of the light modulator.

The analog light modulator is an array of pixel elements supported by a substrate such as a silicon substrate. Each of the pixel elements receives a control signal such as a voltage and outputs a peak color or wavelength in response. In one exemplary system, the temperature control device is disposed between the pixel elements and the substrate. In this system, the temperature control device heats and/or cools a portion of the light modulator disposed between the pixel elements and the substrate.

In one exemplary system, one temperature control device controls the temperature for all of the pixel elements. Another system makes use of a temperature control device disposed adjacent to each pixel element. According to yet another exemplary system, multiple temperature control devices are used that each control a temperature adjacent to multiple pixel elements.

Under control of the control electronics the temperature control device controls a temperature of the portion of the light modulator adjacent to the pixel elements to within a specified temperature range. The temperature range includes a lower control limit and preferably an upper control limit. At an initial startup of an exemplary projection system, prior to operating the light modulator, the temperature control device heats the portion of the light modulator to at least the lower control limit. Then during operation, the temperature control device maintains the temperature of the portion of the light modulator between the lower control limit and the upper control limit. Preferably the temperature control device can cool the portion (such as with thermoelectric cooling) of the light modulator to avoid temperature excursions that exceed the upper control limit.

These apparatuses and methods will be discussed in more detail. First, a general schematic view of a projector system is discussed with reference to FIG. 1, including how the elevated threshold temperatures may be determined. Thereafter, an exemplary temperature control device that provides heating will be discussed with reference to a single DLD followed by a discussion of an exemplary temperature control device that is able to actively cool and/or heat the device. Some exemplary processes a controller uses to maintain the temperature of a device above the threshold temperature will then be discussed, followed by a discussion of some exemplary processes a controller uses to maintain the temperature of a device below the threshold temperature and ending with a discussion of an exemplary process that a controller uses to actively maintain the temperature of a device within a certain range.

As used herein and in the appended claims, the terms "diffractive light device" and "DLD" are meant to be broadly understood as any device or structure that produces color by controlling the gap size between a reflective surface and one or more charge plates by balancing two forces: electrostatic attraction based on voltage and charge on the plates, and a spring constant of one or more "flexures" supporting the reflective surface. Additionally, the term "Micro-Electro Mechanical System" or "MEMS" is meant to be understood broadly as describing any very small (micro) mechanical device that may be constructed on a single semiconductor chip and which may be fabricated using integrated circuit (IC) batch-processing techniques. Light modulator assembly is meant to be broadly understood as any assembly capable of modulating light.

In the following description, for purposes of explanation, numerous specific details are set forth in order to provide a thorough understanding of the present method and apparatus. It will be apparent, however, to one skilled in the art that the present method and apparatus may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Display System

FIG. 1 is a schematic illustration of a display system (100) that includes a light modulator assembly (110) and an illumination light engine (120) each coupled to a controller (130), which controls their operation. The light modulator assembly (110) also includes a temperature control device (150) that heats a portion of the light modulator assembly (110) to a level above an elevated threshold temperature or a lower control limit (LCL) temperature and maintains the light modulator assembly (110) above that LCL temperature. By maintaining the light modulator assembly (110) above this LCL temperature, the performance characteristics of the light modulator assembly (110) can be rendered less sensitive to temporal changes in heat energy exposure.

The light modulator assembly (110) includes an analog light modulator array such as a diffractive light device array (140) (DLD array) that receives light from the light engine (120). The DLD array (140) modulates this light under the control of the controller (130) and passes the modulated light to a display surface for viewing. As will be discussed in more detail with reference to FIG. 2, only a small percentage of the light received by the DLD array (140) is emitted after the light has been modulated. Much of the rest of the light is absorbed by the DLD array (140). This light absorption causes the DLD array to heat up.

For example, the exemplary DLD array (140) operates by interference. As a result, in a light generating state the DLD array (140) frequently receives white light and then absorbs all of the light except for a spectral distribution that is peaked about one wavelength. Thus, the modulator array, and hence the modulator assembly, absorbs about fifty percent or more of the incoming light. The amount of heat absorbed depends at least in part on the wavelength of the light emitted. As the wavelength of the emitted light changes, such as when different colors are output by the DLD array (140), the amount of heat absorbed by the DLD array (140) changes. In other words, there are fluctuations in the energy the light modulator assembly (110) absorbs as a result of the modulation.

The temperature control device (150) actively offsets these fluctuations to maintain the light modulator assembly (110) above an elevated threshold or LCL temperature and below a predetermined maximum temperature or upper control limit (UCL) temperature. In order to maintain the DLD array (140) above a given temperature, the controller (130) must first determine the temperature of the DLD array (140). For example, the controller (130) may be configured to interact directly with the temperature control device (150) to monitor the temperature of the light modulator assembly (110). Alternatively, the modulator assembly (110) may include a temperature sensor coupled to the controller (130). In any case, the controller (130) receives information about the temperature of the light modulator assembly (110).

If the controller (130) determines that the temperature of the light modulator assembly (110) has fallen below the LCL temperature or an elevated threshold level, the controller directs the temperature control device (150) to heat up until the light modulator assembly (110) is again above the elevated threshold temperature. If the temperature is elevated above a maximum level, the controller (130) may shut off power to the temperature control device and allow the temperature to fall through unforced cooling. Alternatively, the controller (130) may direct the temperature control device (150) to cool the device until it is below the maximum level. The process the controller will undertake depends on the configuration of the temperature control device and the desired performance characteristics of the DLD array (140). Details of the elevated threshold temperature will now be discussed.

The elevated threshold temperature may be related to the black state temperature of the DLD array (140). The black state of a DLD or similar device refers to the state wherein the device, and hence the assembly of which the device is a part, absorbs more than about 90% of the light directed to the device. The black state temperature of a device is the steady state temperature of that device when it absorbing about 90% or more of light directed thereto. Because this temperature is a steady state temperature, the amount of heat the device is absorbing from a light source is equal to the amount of heat dissipated by the device.

An exemplary black state temperature depends upon the absorbed power level and the thermal resistance of the system according to the following:

$$T_{black} = T_{ambient} + R_{system} * P_{absorbed}$$

where $T_{black}$ is the steady state temperature of the modulator in black state, $T_{ambient}$ is the ambient temperature, $R_{system}$ is the system thermal resistance, including a parallel and series arrangement of conductive, convective, and radiative components, and $P_{absorbed}$ is optical power absorbed by the array or the heat flow being passed to the ambient air. The elevated threshold temperature may be set to the black state temperature, or it may be offset there from by some constant such that the threshold temperature is either higher or lower than the black state temperature.

Further, the elevated temperature threshold may be based on the steady operating temperature of the device. In general, the steady state operating temperature may depend upon $T_{black}$ and the heat transfer rate of the device. In the case of a complimentary metal oxide semiconductor (CMOS) type device, the steady state operating temperature is frequently below about 110 degrees Celsius. Accordingly, the elevated temperature threshold may be based on the steady operating temperature of the device, which may be based on $T_{black}$.

In the case of a DLD array (140), it may be desirable to set the elevated threshold temperature at or above the black state temperature. In such a case, the DLD array (140) may be initially heated to the black state temperature. Thereafter, when the amount of heat applied is removed or decreased and light is directed to the device, the light absorbed due to the modulation will not substantially raise the temperature of the DLD. If the temperature of the DLD array (140) is not substantially affected, the spring constant rate of the flexures of each DLD in the array will not be substantially affected. As a result, if the DLD array (140) is calibrated near the black state temperature, the heat absorbed by the DLD array does not cause substantial undesirable color shifts due to changes in the spring rates of the flexures or other heat effects.

Accordingly, the temperature control device (150) may be used to initially heat a device in order to minimize undesirable color shifts in the output of the projector system (100). The temperature control device (150) may also be configured to maintain the temperature of the light modulator assembly (110) above the elevated threshold temperature. Further, the temperature control device (150) may be configured to lower the elevated threshold temperature of the light modulator assembly (110) by lowering $R_{system}$, which is the thermal resistance of the system.

In addition, as previously introduced, the light modulator assembly (110) may be configured to provide information about the temperature of the light modulator assembly (110) to the controller (130). The controller (130) uses this information in determining whether to use the temperature control device (150) to heat the device and/or to use the temperature control device (150) to cool the device. Two exemplary temperature control devices will be discussed in more detail below.

A temperature control device that includes a thin-film resistor and a heat will first be discussed with reference to FIG. 2 and a temperature control device that includes a Peltier junction and a heat sink will then be discussed with reference to FIG. 3. For ease of explanation, each of these exemplary configurations will be discussed with reference to the function of a single DLD.

Temperature Control Device Having a Resistive Heater

Figure 2:
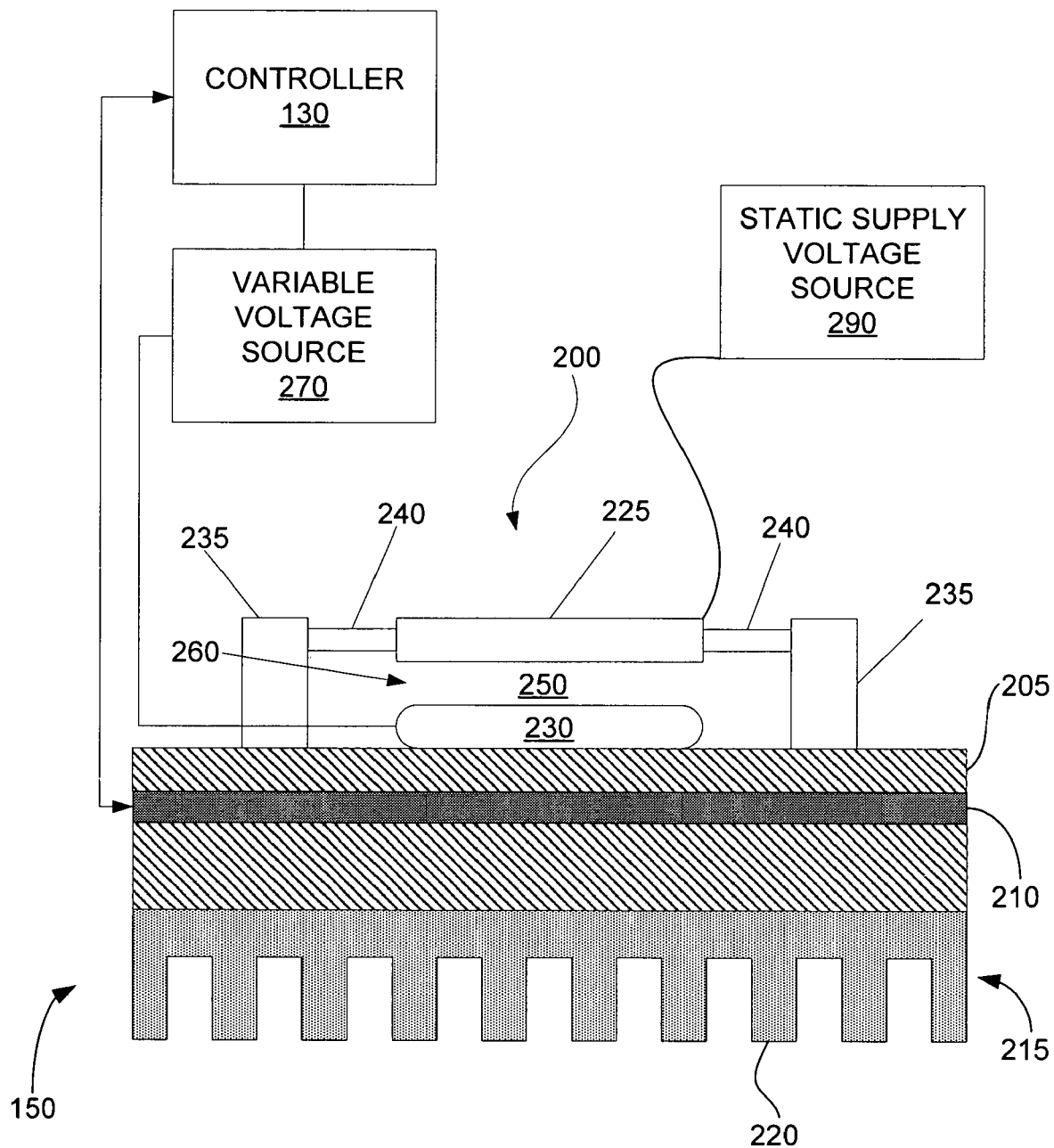
FIG. 2 is a schematic cross-sectional view illustrating a DLD pixel cell with a temperature control device coupled thereto.

FIG. 2 is a schematic diagram illustrating an exemplary embodiment of a diffraction light device (DLD) (200). The DLD (200) shown may be incorporated into any number of image display devices including, but in no way limited to, television sets, video monitors, computer monitors, etc. While the device shown in FIG. 2 is a DLD (200), the present system and method may be incorporated into any number of MEMS devices.

The DLD (200) is formed on a substrate (205). The temperature control device (150), located below the DLD (200), is sufficiently near the DLD (200) as to be thermally coupled thereto. The temperature control device (150) includes a resistive heater (210) and a heat sink (215) with cooling fins (220). As previously described, the temperature control device (150) heats the DLD (200) to a temperature at or above the elevated threshold temperature.

The heat sink (215) and cooling fins (220) lower the level of the elevated threshold temperature. In particular, as previously discussed, the elevated threshold temperature may be determined using the black state temperature of the light modulator assembly. The black state temperature is reached when the heat generated by light absorption equals the heat dissipated by the light modulator assembly (110). Heat from the DLD (200) is drawn into the heat sink (215), which lowers the thermal resistance of the system. Further, the cooling fins (220) increase the rate that the light modulator assembly (110) dissipates heat. As a result, less heat accumulates in the light modulator assembly (110), thereby lowering the black state temperature of the light modulator assembly (110).

The exemplary temperature control device (150) heats the DLD (200) when the controller (130) applies current to the resistive heater (210), which may be a thin-film resistive heater. This heat may be applied to raise the temperature of the DLD (200) to the elevated threshold temperature or to maintain the temperature of the DLD (200) at or above the elevated threshold temperature (200) as necessary. Further, the resistive heater (210) may be used to sense and monitor the temperature of the DLD (200).

Knowledge of how the resistance of the resistive heater (210) varies with temperature can be used to estimate the temperature of the DLD (200). The resistance of the resistive heater (210) varies with temperature such that as the resistive heater (210) is heated its resistance decreases. For example, the resistance of the resistive heater (210) may be determined if the voltage applied to the resistive heater (210) is known as well as the amount of current that is drawn since voltage equals current multiplied by resistance. By dividing the measured voltage by the measured current drawn, resistance may be determined.

Once the resistance at that time is determined, the temperature is readily estimated. As previously discussed, the DLD (200) is thermally coupled to the temperature control device (150). Thus the temperature of the DLD (200) may be estimated using the resistive heater (210). The operation of the DLD (200) with the temperature control device (150) will now be discussed in more detail.

The DLD (200) displays, at least partially, a pixel of a displayable image. The DLD (200) includes a top reflector (225), a bottom reflector (230), a support structure (235), and flexures (240). A resonant optical cavity (250) is defined between the reflectors (225, 230). Thus, the two reflectors (225, 230) are separated by a variable gap distance (260). The top reflector (210) may be semi-transparent or semi-reflective, with the bottom reflector (220) being highly or completely reflective. The flexures (240) may be of any suitable flexible material, such as a polymer, that has linear or non-linear spring functionality.

The bottom reflector (230) is electrically coupled to a variable voltage source (270) or other controllable voltage source controlled by the controller (130) and the top reflector (225) is coupled to a static supply voltage (190). The variable voltage source (270) or other controllable voltage source is configured to selectively vary a voltage level applied to the bottom reflector (230). In response to the voltage level provided to the bottom reflector (230), an electro-static attraction may be induced to controllably vary the gap (260) between the top reflector (225) and the bottom reflector (230). The electro-static attraction is opposed by the flexures (240). By knowing the spring constant of the flexures (240) and the electrostatic force exerted by the bottom reflector (230) in response to applied voltages, the size of the variable gap (260) can be selectively controlled.

By controlling the variable gap distance (260), the optical cavity (250) is adjusted to select a visible wavelength at a particular intensity using optical interference. Depending on the configuration of DLD (200), the optical cavity (250) can either reflect or transmit the wavelength at the desired intensity. That is, the optical cavity (250) can be reflective or transmissive in nature. Accordingly, the optical cavity (250) can be tuned to a desired wavelength at a desired intensity by controlling the gap distance (260).

Several factors may affect the value of the variable gap distance (260) such that it is not at its intended value. Examples of such factors may include a variation in the temperature of the DLD and physical characteristics of the reflectors (225, 230). The support structure (235) and the flexures (240) are tuned for operation at elevated temperatures. Accordingly, the performance of the DLD (200) is predictable at elevated temperatures.

Further, the exemplary temperature control device (150) interacts with the controller (130) to heat the DLD (200) to or above the elevated threshold temperature and to maintain the DLD (200) at or above the elevated temperature during operation. As a result, performance of the light modulator assembly can be rendered less sensitive to temporal changes in heat energy exposure. The exemplary temperature control device (150) also includes the heat sink (215) with cooling fins (220) to lower the elevated threshold temperature. Other exemplary temperature control devices provide alternative ways to heat and cool the DLD array, as will now be discussed in more detail.

Temperature Control Device Having a Peltier Junction

Figure 3:
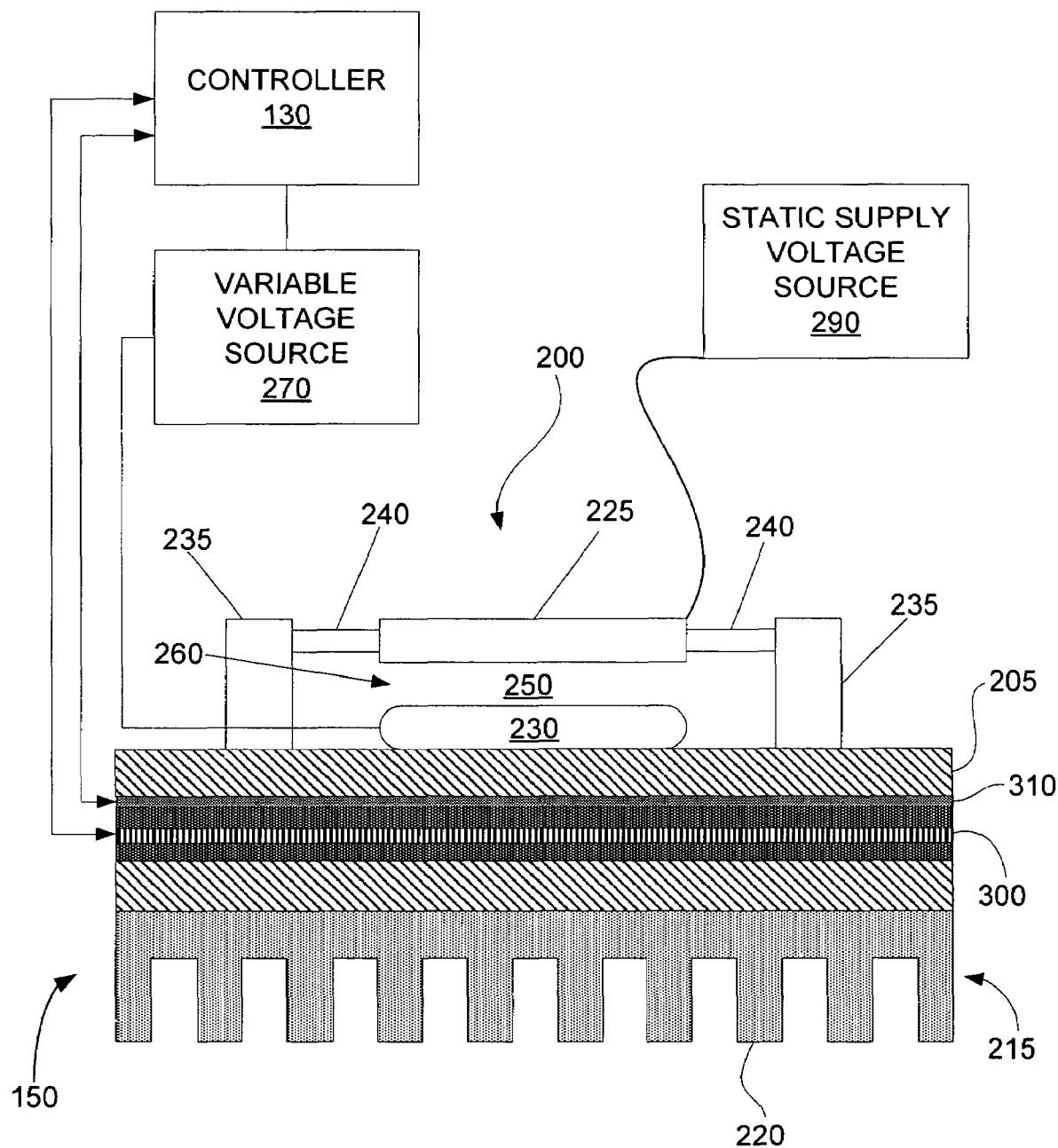
FIG. 3 is a schematic cross-sectional view illustrating a DLD pixel cell with a temperature control device coupled thereto.

FIG. 3 shows another exemplary temperature control device (150-1) that includes a thermoelectric heat transfer device such as a Peltier junction (300) coupled to the heat sink (215). The Peltier junction (300) allows the DLD (200) to operate an elevated temperature, but instead of heating the DLD (200) above some elevated threshold temperature, the Peltier junction (300) may be used to cool the DLD (200) to maintain the DLD (200) near but below some elevated threshold temperature.

Thermoelectric coolers, such as the Peltier junction (300), are solid state heat pumps that operate on the Peltier effect. The Peltier effect refers to the heating or cooling effect when electric current passes through two conductors. A voltage applied to the free ends of two dissimilar materials creates a temperature difference. With this temperature difference, Peltier cooling will cause heat to move from one side of the Peltier junction (300) to the other.

The Peltier junction (300) includes an array of p- and n-type semiconductor elements that act as the two dissimilar conductors. The array of elements is soldered between two ceramic plates, electrically in series and thermally in parallel. As a DC current passes through one or more pairs of elements from n- to p-, there is a decrease in temperature at the junction ("cold side") resulting in the absorption of heat from the environment.

The heat is carried through the cooler by electron transport and released on the opposite ("hot") side as the electrons move from a high to low energy state. The heat pumping capacity of a Peltier junction is proportional to the current and the number of pairs of n- and p- type elements (or couples). When this current flow is used such that the cold side of the Peltier junction (300) is adjacent the substrate (205) on the side of the DLD (200), the Peltier junction is operating in the cooling mode. In the cooling mode, heat that accumulates on the hot side is absorbed by the heat sink (215), which dissipates the heat.

The operation of the Peltier junction (300) can be switched such that the heat sink side becomes the cold side by switching the polarity of the applied current. When the cold side is adjacent the heat sink (215) the hot side is adjacent the substrate (205) and the DLD (200) such that the Peltier junction heats the DLD (200). When the Peltier junction (300) thus heats the DLD (200), the Peltier junction is said to be operating in the heating mode.

In operation, the controller (130) may cause the temperature control device (150-1) to heat the DLD (200) to near the elevated threshold temperature by using the Peltier junction (300) in the heating mode. Thereafter, the temperature control device (150-1) may be used to remove heat from the DLD (200) as necessary. For example, when the controller (130) senses that the temperature of the DLD is greater than the UCL temperature, the controller (130) activates the Peltier junction (300) to operate in cooling mode. The controller (130) estimates the amount of heat to be removed and the cooling rate by calculating the difference between the energy associated with the DLD (200) at a given temperature and the energy associated with the DLD (200) below the elevated threshold temperature. The controller (130) uses this calculated difference to cool the DLD (200) below the elevated threshold temperature.

In addition to maintaining the DLD (200) below the LCL temperature, the Peltier junction (300) may also be used to maintain the temperature of the DLD (200) within a predetermined range. As previously discussed, the amount of heat absorbed during operation of the DLD (200) fluctuates. If this fluctuation is sufficiently large, it may raise the temperature of the DLD (200) sufficiently to cause some degree of undesirable color shift due to a softening of the spring mechanism (240). The temperature control device (150-1) also includes a temperature sensor (310) for sensing the temperature of the DLD (200) and hence the fluctuations.

The temperature sensor (310) senses the temperature of the DLD (200) and conveys that information to the controller (130). The controller (130) uses that information to control the Peltier junction (300) to maintain the temperature of the temperature of the DLD (200) within the predetermined temperature range.

The temperature range may be established by determining how the spring mechanism (240) may be heated without substantially affecting the spring constant of the spring mechanism (240). For example, the lower bound of the temperature range may be the elevated threshold temperature. The upper bound of the temperature range may be established to minimize color shift. As previously discussed, color shift may occur when the gap distance (260) varies from what was intended because of a change in the spring constant of the flexures (240). The upper bound of the temperature range may be established as a temperature below which the color output of the DLD (200) does not suffer too much from undesirable color shift. Thus, the temperature range may be established to ensure predictable operation of the DLD (200).

If the temperature is below the specified temperature range, the controller (130) causes the Peltier junction (300) to operate in heating mode until the temperature of the DLD (200) is within the predetermined range. If the temperature is above the specified temperature range, the controller (130) causes the Peltier junction (300) to operate in the cooling mode until the temperature of the DLD is within the predetermined range. As a result, performance of the light modulator assembly can be rendered less sensitive to temporal changes in heat energy exposure. The specific operation of the controller device as applied to a resistive heater and a Peltier junction will now be discussed in more detail below.

Maintaining an Assembly Above an Elevated Threshold Temperature

Figure 4:
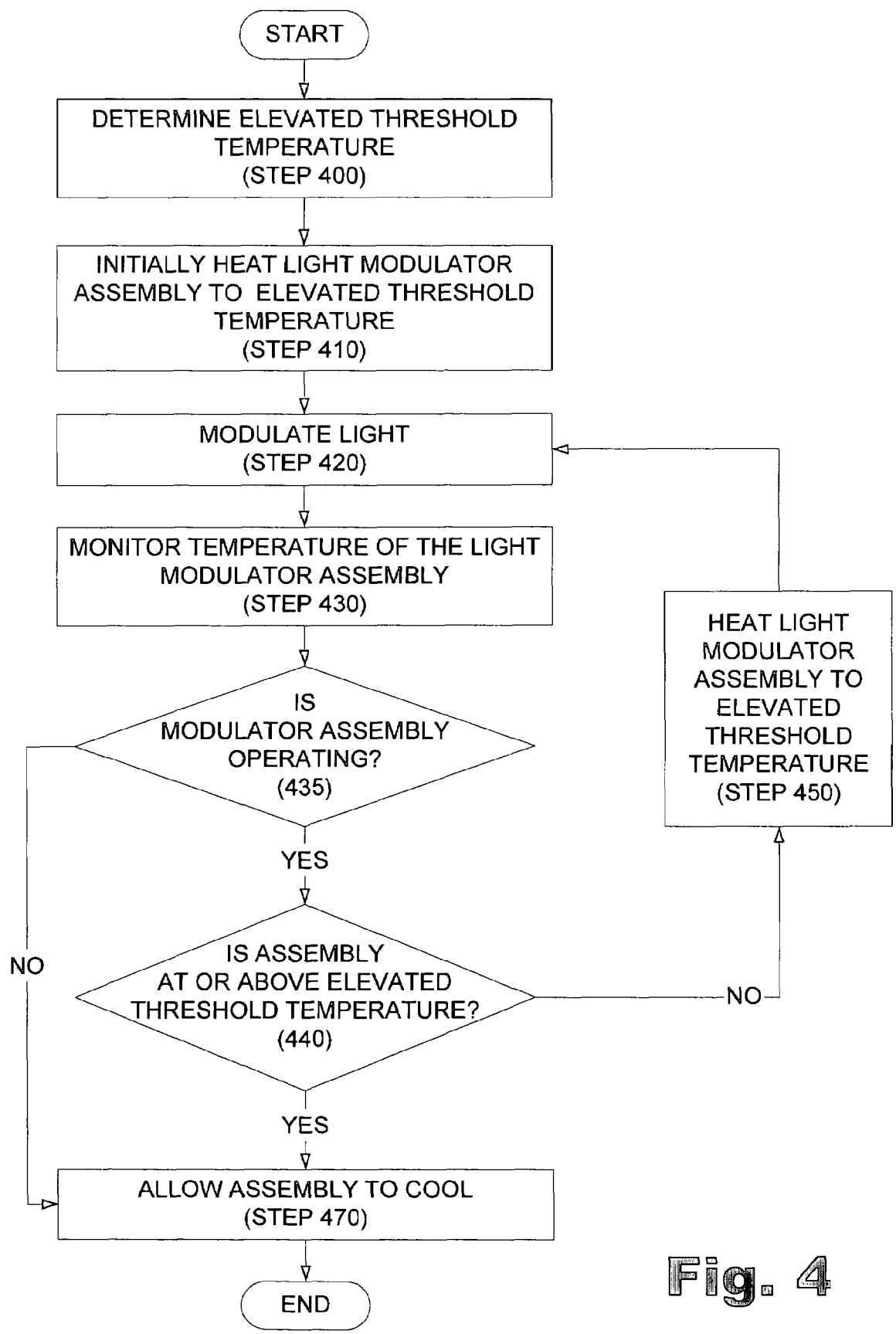
FIG. 4 is a flow chart illustrating a method of controlling a light modulator assembly that includes a temperature control device.

FIG. 4 is a flowchart illustrating a method a processor uses in operating a light modulator assembly that includes MEMS device, such as a DLD and a temperature control device. The method begins by determining the elevated threshold or LCL temperature of the light modulator assembly (step 400). As previously discussed, the elevated threshold temperature may be established, at least in part, by determining the black state temperature of the light modulator assembly.

The black state temperature of the light modulator assembly refers to the steady state temperature of the light modulator assembly when the light modulator assembly is absorbing 90% or more of the light generated by a light source, such as a light engine. The processor calculates the black state temperature, which may be determined by multiplying the thermal resistance $R_{system}$ by the power absorbed by the system, $P_{absorbed}$ and adding that result to $T_{ambient}$, which is the ambient temperature where the system is to be located. The black state temperature may be reduced in several ways, including reducing the thermal resistance of the system. The thermal resistance of the system can be reduced, for example, by providing heat sinks and cooling fins to the system. Further, the black state temperature may be lowered by reducing the amount of power absorbed by the system. This reduction maybe accomplished by providing active cooling to the system.

Once the black state temperature has been determined, the elevated threshold temperature may be established. As previously discussed, the elevated threshold may be equal to the black state temperature, the black state temperature may be used as a factor, and/or an offset temperature may be used to determine the elevated threshold temperature. The elevated threshold temperature may then be used to determine how much power is absorbed by the light modulator assembly.

If the light modulator system is being initially operated, such that the light modulator system is not above the elevated threshold temperature, the controller directs the temperature control device to initially heat the light modulator assembly to a temperature at or above the elevated threshold temperature (step 410).

During the operation of the light modulator assembly, a light engine directs light to the light modulator assembly where the light is modulated (step 420) while the controller monitors the temperature of the light modulator assembly (step 430) and determines whether the light modulator assembly is at or above the threshold temperature (determination 440). These three processes are carried out in parallel for the duration of the operation of the light modulator assembly.

The temperature monitoring will now be discussed in more detail. The controller monitors the temperature of the substrate to estimate the temperature of the light modulator assembly (step 430). The substrate and the MEMS device are typically in close proximity with each other such that the temperature of the MEMS device is approximately equal to the temperature of the substrate. The temperature of the substrate, and hence the device, may be measured in a variety of ways.

For example, if the temperature control device includes a resistive heater, the temperature may be measured by determining the resistance of the resistive heater. As previously discussed, the resistance of the resistive heater changes with temperature. Accordingly, knowledge of how the resistance of the resistive heater changes with temperature allows the controller to estimate the temperature of the light modulator assembly by using the resistance of the resistive heater. In addition, a separate temperature sensor may be used to determine the temperature of the light modulator assembly.

The controller uses the temperature information to estimate the amount of heat the temperature control device should deliver to the light modulator array. For example, the controller estimates the amount of energy associated with the light modulator assembly at a given temperature and the amount of energy associated with the light modulator assembly at the black state temperature. Once the system has begun to monitor the temperature of the light modulator assembly, the system determines whether the light modulator assembly is operating (determination 435). If the light modulator is not operating (NO, determination 435), no further steps are taken and the light modulator assembly is allowed to cool (step 470). If the light modulator assembly is operating (YES, determination 435), the system then determines whether the light modulator assembly is at or above the elevated threshold temperature (determination 440).

If the temperature of the light modulator assembly drops below the elevated threshold temperature (YES, determination 440), the controller directs the temperature control device to heat the light modulator assembly (step 450) to the elevated threshold temperature by estimating the difference in the amount of energy associated with a sensed temperature and the amount of energy associated with the elevated threshold temperature.

Further, the controller uses information about the duty cycle of the light modulator assembly to determine how much heat should be applied to heat the light modulator assembly (step 450). For example, if the duty cycle of the light modulator assembly is producing bright images, less heat will be absorbed by the light modulator assembly. Consequently, the controller will direct the temperature control device to apply a relatively larger amount of heat. This calculation may be done on an ongoing basis to ensure that the temperature of the light modulator assembly remains at or above the elevated threshold temperature.

Once the light modulator assembly has again been heated to or above the elevated threshold (step 450), the controller continues to monitor the temperature of the light modulator assembly and continues to direct the temperature control device to heat the light modulator assembly as necessary. This process continues for as long as the light modulator assembly is operating (YES, determination 435).

Once the controller determines that the light modulator assembly is no longer operating (NO, determination 435), the controller allows the light modulator assembly to cool (step 470). As a result, the controller heats the light modulator assembly to or above the elevated threshold temperature and maintains the light modulator assembly at or above this temperature during the operation of the light modulator assembly. By operating at or above the elevated threshold temperature, the performance of the light modulator assembly can be rendered less sensitive to temporal changes in heat energy exposure.

This exemplary method refers to the application of heat to maintain the light modulator assembly at or above the threshold temperature. In the case of an exemplary method wherein the light modulator assembly is cooled to maintain it near the elevated threshold temperature, heat is removed from the light modulator array as will be discussed with reference to FIG. 5.

Maintaining an Assembly Below an Elevated Threshold Temperature

Figure 5:
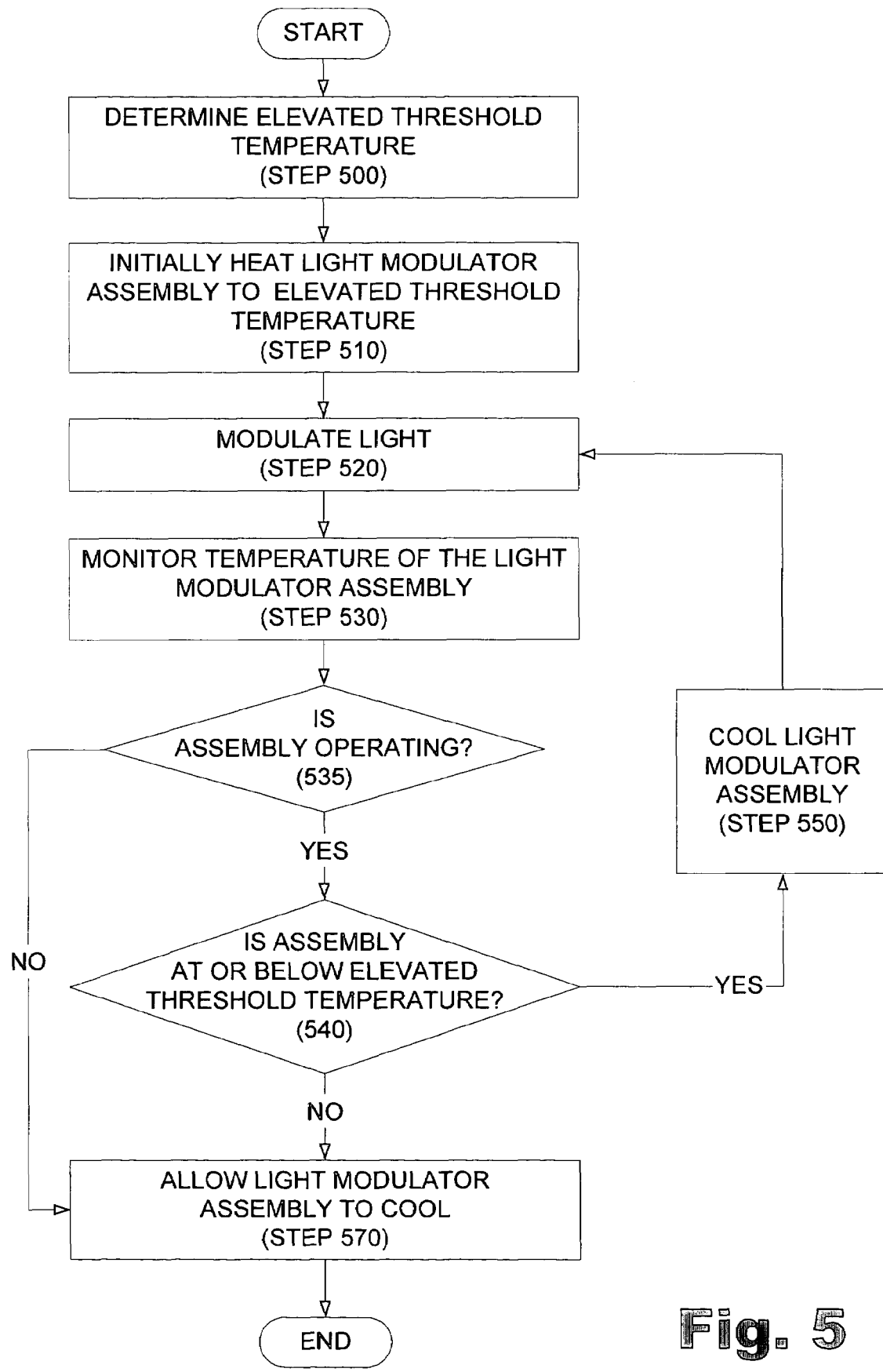
FIG. 5 is a flow chart illustrating a method of controlling a light modulator assembly that includes a temperature control device.

FIG. 5 is a flowchart illustrating a method of using a controller to control a light modulator assembly with active cooling capabilities. The controller directs the temperature control device to cool the light modulator assembly when the temperature of the light modulator assembly rises above an elevated temperature threshold. As a result, the light modulator assembly is maintained at a temperature near the elevated temperature threshold such that the performance of the light modulator assembly can be rendered less sensitive to temporal changes in heat energy exposure.

The method begins in a similar fashion as the process discussed with reference to FIG. 4, wherein the processor first calculates the elevated temperature threshold (step 500) and then causes the temperature control device to initially heat the light modulator assembly to that elevated temperature threshold (step 510). This elevated temperature threshold may be a maximum temperature. An exemplary temperature control device is a Peltier junction, which is placed in heating mode to initially heat the light modulator assembly to the elevated temperature threshold.

As previously discussed, during the operation of the light modulator assembly, a light engine directs light to the light modulator assembly where the light is modulated (step 520) while the controller monitors the temperature of the light modulator assembly (step 530) and determines whether the light modulator assembly is operating (determination 535) and whether the light modulator assembly is at or below the threshold temperature (determination 540). These three processes are carried out in parallel for the duration of the operation of the light modulator assembly.

If the controller determines that the temperature of the light modulator assembly is above the elevated temperature threshold (NO, Determination 540), the controller directs the temperature control device to cool the light modulator (step 550). In particular, the controller estimates the amount of heat the temperature control device should remove from the light modulator array using information about the duty cycle of the light modulator assembly and the elevated threshold temperature. For example, if the duty cycle of the light modulator assembly is producing bright images, less heat will be absorbed by the light modulator assembly. Consequently, the controller will direct the temperature control device to remove a relatively smaller amount of heat.

Accordingly, the amount of heat removed by the temperature control may be sufficient to lower the temperature of the light modulator assembly to the elevated threshold temperature. As previously discussed, maintaining the temperature of the light modulator assembly at or near an elevated threshold temperature, allows the performance of the light modulator assembly to be more accurate and repeatable. This process continues for as long as light is directed to the light modulator assembly (YES, determination 535).

Once the controller determines that light modulator assembly is no longer operating (NO, determination 535), the controller allows the light modulator assembly to cool (step 570). As a result, the controller controls a temperature control device to heat a light modulator assembly to or above the elevated threshold temperature and to maintain the light modulator assembly at or above this temperature during the operation of the light modulator assembly. By operating the light modulator assembly at or above the elevated threshold temperature, the controller is able to provide predictable and consistent performance characteristics for the light modulator assembly.

The methods discussed with reference to FIGS. 4 and 5 describe methods of maintaining the temperature of the light modulator assembly on one side of the elevated threshold temperature. Other exemplary methods maintain the temperature of the light modulator assembly within a predetermined temperature range, as will now be discussed.

Selectively Controlling the Temperature Range of a Light Modulator Assembly

Figure 6:
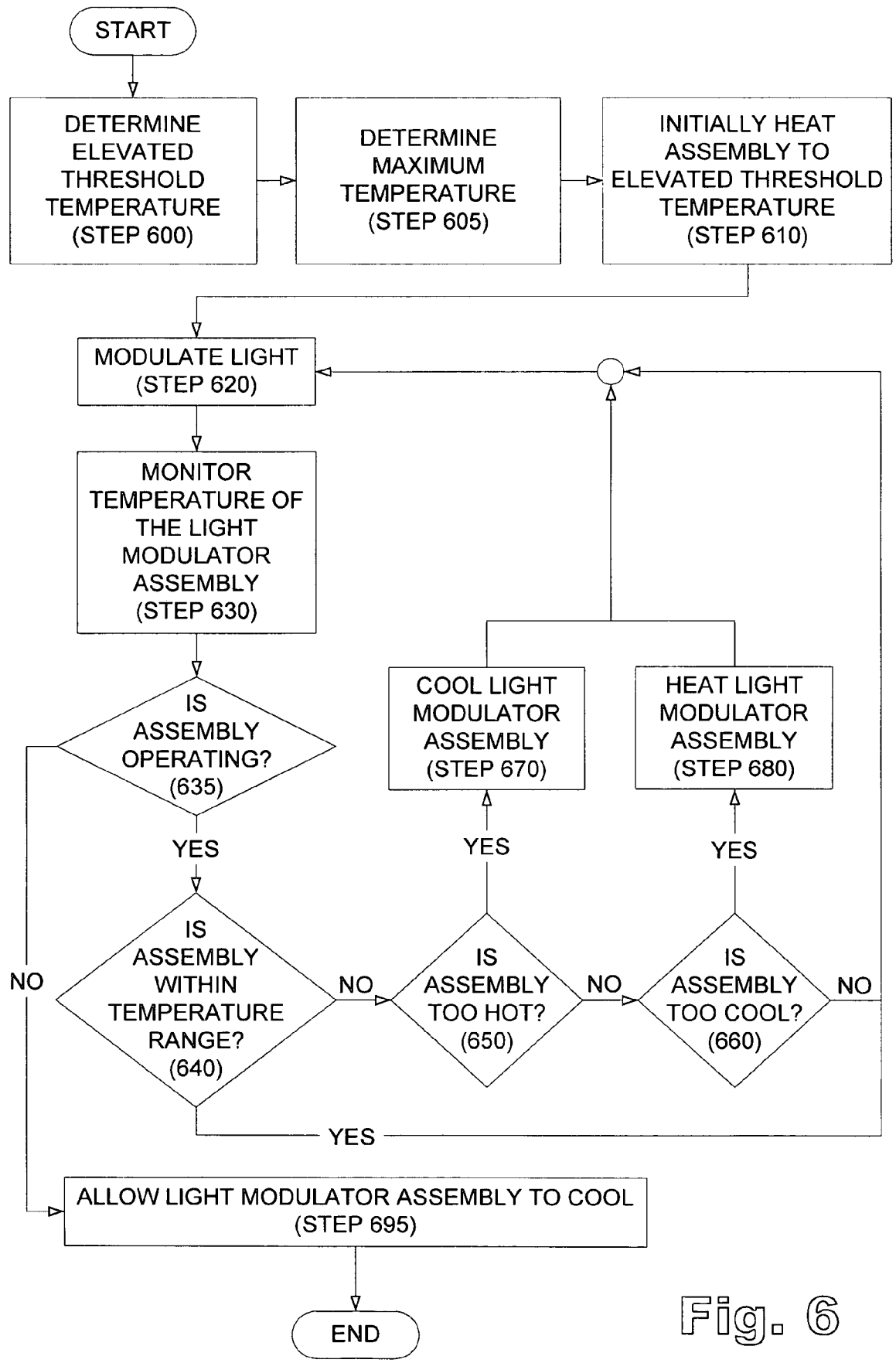
FIG. 6 is a flow chart illustrating a method of controlling a light modulator assembly that includes a temperature control device.

FIG. 6 is a flowchart illustrating a method of using a controller to control a light modulator with active cooling capabilities. In addition to determining the elevated threshold temperature or LCL temperature (step 600) as described with reference to FIG. 4 (step 400) and FIG. 5 (step 500), the controller also determines a maximum temperature or UCL temperature (step 605). The maximum temperature of the light modulator assembly is established by determining the temperature above which the performance of the light modulator assembly begins to change unacceptably. As will be discussed in more detail, the controller maintains the temperature of the light modulator assembly within this predetermined range.

Once this range has been determined, the controller directs the temperature control device to initially heat the assembly to the elevated threshold temperature (step 610). During the operation of the light modulator assembly, a light engine directs light to the light modulator assembly where the light is modulated (step 620) while the controller monitors the temperature of the light modulator assembly (step 630) and determines whether the light modulator assembly is operating (determination 635) and whether the light modulator assembly is within the predetermined temperature range (determination 640).

If the temperature of the light modulator assembly is not within the predetermined temperature range (NO, determination 640), the controller then determines whether the light modulator assembly is below the elevated threshold temperature, and thus the assembly is too cool (determination 650) or whether the light modulator assembly is above the maximum temperature and thus too hot (determination 660).

If the light modulator assembly is below the elevated threshold temperature (YES, determination 650), the controller directs the temperature control device to heat the light modulator assembly to the elevated threshold temperature (step 670). Once the light modulator assembly reaches the elevated threshold temperature, the controller reduces the amount of heat the temperature control device applies or even turns off the temperature control device while continuing to monitor the temperature of the light modulator assembly.

If the temperature of the light modulator assembly is above the maximum temperature (YES, determination 660), the controller directs the temperature control device to cool the light modulator assembly (step 680) until the temperature of the light modulator assembly is below the maximum temperature and thus within the predetermined range. This process continues for as long as the light modulator assembly is operating (YES, determination 635).

Once the controller determines that light is no longer to be directed to the light modulator assembly (NO, determination 635), the controller allows the light modulator assembly to cool (step 695). As a result, the controller controls a light modulator assembly to heat a light modulator assembly to or above the elevated threshold temperature and to maintain the light modulator assembly at or above this temperature during the operation of the light modulator assembly. By operating at or above the elevated threshold temperature, the controller is able to provide predictable and consistent performance characteristics for the light modulator assembly.

The methods discussed with reference to FIGS. 4–6 can be implemented in several ways. For the highest level of control, a temperature control device may be provided, monitored and controlled for each pixel. In addition, temperature control devices may be provided for groups of pixels or for an entire array of pixels.

In addition, the temperature control devices discussed thus far include resistive heaters and Peltier junctions located between the DLD and a heat sink. A different way to control light modulator temperature would be through cooling using methods known in the art, including attaching heat sink and fans to the chip. A liquid cooled system could also be envisioned, whereby a cooling fluid is circulated in a manner to remove heat from the chip, either by direct contact with the chip or through an attached heat sink which is then plumbed to a radiator-type device or other means to remove heat from the circulating fluid.

In conclusion, an assembly is provided that includes a temperature control device for maintaining an assembly at or near an elevated threshold temperature. The individual components of the assembly are tuned for operation at or near the elevated threshold temperature. As a result, performance of the light modulator assembly can be rendered less sensitive to temporal changes in heat energy exposure.

The assembly may be maintained near the elevated temperature by heating the device as the temperature falls and/or cooling the device as the temperature of the device rises. A controller coupled to the light modulator assembly can be used to modulate light, monitor the temperature of the assembly, and correct the temperature as necessary.

The preceding description has been presented only to illustrate and describe exemplary embodiments of the present system and method. It is not intended to be exhaustive or to limit the system and method to any precise form disclosed. Many modifications and variations are possible in light of the above teaching. It is intended that the scope of the system and method be defined by the following claims.

What is claimed is:

1. A light modulator assembly, comprising:
   a micro-electro mechanical semiconductor device (MEMS device) formed an a substrate;
   a light engine for illuminating said MEMS device; and
   a temperature control device thermally coupled to said substrate and configured to heat said MEMS device during operation of said MEMS device and to maintain said MEMS device at or above an elevated threshold temperature, said temperature control device being separate from said light engine.

2. The light modulator assembly of claim 1, wherein said MEMS device comprises a diffractive light device (DLD).

3. The light modulator assembly of claim 2, wherein said DLD is an interferometric DLD.

4. The light modulator assembly of claim 1, wherein said temperature control device includes a resistive heater.

5. The light modulator assembly of claim 4, wherein said resistive heater comprises a thin-film resistive heater.

6. The light modulator assembly of claim 4, wherein said resistive heater is configured to provide information about a temperature of said assembly.

7. The light modulator assembly of claim 1, wherein said temperature control device includes a resistive heater and a heat sink.

8. The light modulator assembly of claim 7, wherein said heat sink includes cooling fins.

9. The light modulator assembly of claim 1, wherein said MEMS devices is specifically calibrated for operation at or above said elevated threshold temperature rather than at a lesser ambient temperature.

10. The light modulator assembly of claim 1, further comprising a controller for determining a temperature of said MEMS device and controlling said temperature control device to selectively heat said MEMS device to maintain said MEMS device at or above said elevated threshold temperature.

11. The light modulator assembly of claim 10, wherein said controller uses information about a duty cycle of said light modulator assembly to determine how much heat should be applied to heat said light modulator assembly.

12. The light modulator assembly of claim 1, wherein said elevated threshold temperature corresponds to a black state temperature of said MEMS device.

13. The light modulator assembly of claim 12, further comprising a device coupled to said MEMS device that lowers said black state temperature of said MEMS device.

14. The light modulator assembly of claim 13, wherein said device that lowers said black state temperature comprises cooling fins.

15. The light modulator assembly of claim 1, wherein a separate temperature control device is provided for each element of said MEMS device corresponding to a pixel in a display.

16. A light modulator assembly, comprising:
a substrate;
a micro-electro mechanical semiconductor device (MEMS device) formed on said substrate; and
a temperature control device coupled to said substrate and configured to both selectively heat or cool said MEMS device during operation of said MEMS device to maintain said operating MEMS device above an elevated threshold temperature and below an upper threshold temperature.

17. The light modulator assembly of claim 16, wherein said temperature control device includes a thermoelectric heat transfer device.

18. The light modulator assembly of claim 16, wherein said temperature control device includes a Peltier junction.

19. The light modulator assembly of claim 16, wherein said MEMS device is specifically calibrated for operation at or above said elevated threshold temperature rather than at a lesser ambient temperature.

20. The light modulator assembly of claim 16, further comprising a controller for determining a temperature of said MEMS device and controlling said temperature control device to selectively heat or cool said MEMS device to maintain said MEMS device above said elevated threshold temperature and below said upper threshold temperature.

21. The light modulator assembly of claim 20, wherein said controller uses information about a duty cycle of said light modulator assembly to determine how much heat should be applied to heat said light modulator assembly.

22. The light modulator assembly of claim 16, wherein said elevated threshold temperature corresponds to a black state temperature of said MEMS device.

23. The light modulator assembly of claim 16, wherein a separate temperature control device is provided for each element of said MEMS device corresponding to a pixel in a display.

24. A light modulator assembly, comprising:
a substrate;
a micro-electro mechanical semiconductor device (MEMS device) formed on said substrate; and
a temperature control device coupled to said substrate and configured to both selectively heat or cool said MEMS device to maintain said MEMS device within a predetermined, elevated temperature range.

25. The light modulator assembly of claim 24, wherein said temperature control device includes a thermoelectric heat transfer device.

26. The light modulator assembly of claim 24, wherein said MEMS device is specifically calibrated for operation in said elevated temperature range rather than at a lesser ambient temperature.

27. The light modulator assembly of claim 24, further comprising a controller for determining a temperature of said MEMS device and controlling said temperature control device to selectively heat or cool said MEMS device to maintain said MEMS device within said predetermined, elevated temperature range.

28. The light modulator assembly of claim 27, wherein said controller uses information about a duty cycle of said light modulator assembly to determine how much heat should be applied to heat said light modulator assembly.

29. The light modulator assembly of claim 24, wherein said elevated temperature range corresponds to a black state temperature of said MEMS device.

30. The light modulator assembly of claim 29, further comprising a device coupled to said MEMS device that lowers said black state temperature of said MEMS device.

31. The light modulator assembly of claim 30, wherein said device that lowers said black state temperature comprises cooling fins.

32. The light modulator assembly of claim 24, wherein a separate temperature control device is provided for each element of said MEMS device corresponding to a pixel in a display.

33. A method of forming a light modulator assembly, comprising:
forming a plurality of micro-electromechanical system (MEMS) devices configured to operate within an elevated temperature range;
coupling at least one temperature control device to at least one of said MEMS devices, wherein said temperature control device is configured to both selectively heat or coal said MEMS device to maintain said MEMS device within said elevated temperature range.

34. The method of claim 33, wherein said MEMS device is configured to output light in a controlled frequency in response to being exposed to broadband light.

35. The method of claim 34, wherein said MEMS device is a diffractive light device.

36. The light modulator assembly of claim 33, wherein said MEMS device is specifically calibrated for operation in said elevated temperature range rather than at a lesser ambient temperature.

37. The light modulator assembly of claim 33, further comprising a controller for determining a temperature of said MEMS device and controlling said temperature control device to selectively heat or cool said MEMS device to maintain said MEMS device within said elevated temperature range.

38. The light modulator assembly of claim 37, wherein said controller uses information about a duty cycle of said light modulator assembly to determine how much heat should be applied to heat said light modulator assembly.

39. The light modulator assembly of claim 33, wherein said elevated temperature range corresponds to a black state temperature of said MEMS device.

40. The light modulator assembly of claim 39, further comprising a device coupled to said MEMS device that lowers said black state temperature of said MEMS device.

41. The light modulator assembly of claim 40, wherein said device that lowers said black state temperature comprises cooling fins.

42. The light modulator assembly of claim 33, wherein a separate temperature control device is provided for each element of said MEMS device corresponding to a pixel in a display.

43. A light modulator assembly, comprising:
means for modulating light;
means for illuminating said means for modulating light; and
means, thermally coupled to said means for modulating light, for heating said means for modulating light and maintaining said means for modulating light above an elevated threshold temperature during operation of said means for modulating light, wherein said means for heating are separate from said means for illuminating.

44. The light modulator assembly of claim 43, and further comprising means for maintaining said means for modulating light below an upper control temperature.

45. The light modulator assembly of claim 43, wherein said means for modulating light are specifically calibrated for operation at or above said elevated threshold temperature rather than at a lesser ambient temperature.

46. The light modulator assembly of claim 43, further comprising means for determining a temperature of said means for modulating light and for controlling said means for heating to selectively heat said means for modulating light to said elevated threshold temperature.

47. The light modulator assembly of claim 46, wherein said means for determining a temperature of said means for modulating light also uses information about a duty cycle of said means for modulating light to determine how much heat should be applied to heat said moans for modulating light.

48. The light modulator assembly of claim 43, wherein said elevated threshold temperature corresponds to a black state temperature of said means for modulating light.

49. The light modulator assembly of claim 48, further comprising means for lowering said black state temperature of said means for modulating light.

* * * * *

UNITED STATES PATENT AND TRADEMARK OFFICE
CERTIFICATE OF CORRECTION

PATENT NO. : 7,126,741 B2 Page 1 of 1
APPLICATION NO. : 10/917128
DATED : October 24, 2006
INVENTOR(S) : Wagner et al.

It is certified that error appears in the above-identified patent and that said Letters Patent is hereby corrected as shown below:

Col. 14 (line 23), delete "an" and insert therefor --on--.

Col. 16 (line 1), delete "beat" and insert therefor --heat--.

Col. 16 (line 25), delete "coal" and insert therefor --cool--.

Signed and Sealed this

Fourth Day of September, 2007

JON W. DUDAS
*Director of the United States Patent and Trademark Office*